United States Patent
Shih et al.

(10) Patent No.: US 7,995,133 B2
(45) Date of Patent: Aug. 9, 2011

(54) METHOD, APPARATUS FOR CORRECTING IMAGE SIGNAL FROM IMAGE SENSOR, AND IMAGING SYSTEM WITH APPARATUS

(75) Inventors: Pao-Ming Shih, Taipei Hsien (TW); Tai-Hsin Liu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 923 days.

(21) Appl. No.: 11/946,264

(22) Filed: Nov. 28, 2007

(65) Prior Publication Data

US 2008/0291505 A1 Nov. 27, 2008

(30) Foreign Application Priority Data

May 22, 2007 (CN) .......................... 2007 1 0200672

(51) Int. Cl.
*H04N 5/232* (2006.01)
*H04N 9/64* (2006.01)
(52) U.S. Cl. .................. 348/353; 348/243; 348/248
(58) Field of Classification Search .................. 348/243, 348/245, 248, 254, 353–354
See application file for complete search history.

(56) References Cited

U.S. PATENT DOCUMENTS

| | | | |
|---|---|---|---|
| 5,585,841 A * | 12/1996 | Hardin | 348/163 |
| 7,136,100 B1 | 11/2006 | Kato et al. | |
| 7,545,411 B2 * | 6/2009 | Mabuchi et al. | 348/220.1 |
| 7,551,212 B2 * | 6/2009 | Ise | 348/243 |
| 7,750,947 B2 * | 7/2010 | Ahn | 348/222.1 |
| 2003/0107681 A1 * | 6/2003 | Otawara et al. | 348/673 |
| 2004/0246858 A1 * | 12/2004 | Saigusa et al. | 369/53.31 |
| 2005/0285952 A1 | 12/2005 | Kwon et al. | |
| 2006/0119722 A1 * | 6/2006 | Mabuchi et al. | 348/308 |
| 2006/0274173 A1 | 12/2006 | Yoshida et al. | |
| 2007/0216956 A1 * | 9/2007 | Hsieh et al. | 358/3.21 |

* cited by examiner

Primary Examiner — Hung Lam
(74) Attorney, Agent, or Firm — Jeffrey T. Knapp

(57) ABSTRACT

A method of correcting an image signal generated by a charge coupled device (CCD) image sensor in an imaging system is provided. The imaging system stores a number of gamma correction curves, each of which includes a respective correction factor for increasing contrast in a dark portion of the image signal. The method includes: measuring gray scale value of each pixel of the CCD image sensor; estimating a contrast level of an object scene to be imaged using the measured gray scale values; and correcting the image signal using a corresponding gamma correction curve depending on the estimated contrast level of the object scene.

16 Claims, 14 Drawing Sheets

METHOD, APPARATUS FOR CORRECTING IMAGE SIGNAL FROM IMAGE SENSOR, AND IMAGING SYSTEM WITH APPARATUS

BACKGROUND

1. Technical Field

Aspects of the present invention relate to image processing technology and, more specifically, relate to a method and an apparatus for correcting an image signal generated by an image sensor, such as, a charge coupled device (CCD) of an imaging system, and the imaging system having such a charge coupled device (CCD) image sensor.

2. Description of Related Art

In general, image sensors are used in imaging systems, such as, for example, digital cameras, optical scanners and video cameras as light sensing devices to convert a visual image into an electrical signal. An image sensor is typically an array of photoelectric cells, also known as picture elements (i.e., pixels), arranged in a matrix form so as to convert the light energy into electrical signal charge and subsequently output as an image signal, when a visual image is projected thereon. Each of the pixels, which form the visual image, is an optical sensor that is adapted to sense an incident light beam and photo-electrically convert the light beam into electrical signal charge corresponding to the amount of the received light beam. Such an image sensor can be any type of image sensor, such as a charge coupled device (CCD) or complementary metal-oxide semiconductor (CMOS) device. CCD image sensors can be implemented in several different architectures, including, for example, full-frame, frame-transfer and interline techniques depending upon usage and applications.

One of the challenges of utilizing such an image sensor in an imaging system is to reduce image distortion and to minimize any loss of image details in a dark region or a bright region of an image signal. For example, FIG. 13 illustrates a gray scale histogram of an image signal describing a visual image, such as, an object scene with a brightness range beyond a dynamic/effective range of the imaging CCD. As shown in FIG. 13, the gray scale histogram of an image signal is represented by a pixel amount as a function of a gray scale using Cartesian coordinates. Specifically, on the gray scale axis (i.e., X-axis) as a function of the pixel amount axis (i.e., Y-axis), "0" denotes pure black, and "D" denotes pure white. The range 0~D is the dynamic range of the CCD. An area that is located in the lower part of the range 0~D represents a dark portion of the image signal (i.e., shadows). Conversely, an area that is located in the higher part of the range 0~D represents a bright portion of the image signal (i.e., highlights). The histogram contour curve 10, as shown in FIG. 13, indicates: (1) any portion of the image signal brighter than "D" will be displayed as pure white by the pixels corresponding to that portion losing any detail that would be revealed with different degrees of whiteness displayed; and (2) any portion of the image signal blacker than "0" will be displayed as pure black by the pixels corresponding to that portion losing any detail that would be revealed with different degrees of blackness displayed. In other words, the CCD image sensor can not describe the bright portion of an object scene in detail. Additionally, the pixels corresponding to the brightest portion(s) of an object scene may bloom, inducing a smear effect in the CCD image sensor. As a result, characteristics of an image signal may distort. Likewise, the CCD image sensor can not describe the dark portion of the object scene in detail as well.

In order to avoid inducing the smear effect in an image, a CCD image sensor is typically exposed to a smaller amount of light intensity. As result, less image details are lost in the bright portion of an image signal. However, a loss of image details in the dark portion of the image signal is much more severe. Referring to FIG. 14, when a CDD image sensor is exposed to a smaller amount of light, less details are lost in the bright portion of the image signal, but a loss of details in the dark portion of the image signal is severe, as indicated by the histogram contour curve 20.

Therefore, it is desirable to provide a method and an apparatus for correcting an image signal generated from an image sensor, such as a CCD image sensor, and an imaging system incorporating such a CCD image sensor so as to reduce image distortion and to minimize any loss of image details in a dark region or a bright region of an image signal.

SUMMARY

Several aspects and example embodiments of the present invention relate to an apparatus and a method of correcting an image signal generated by a CCD image sensor to reduce image distortion and to minimize any loss of image details in a dark region or the bright region of an image signal.

Additional aspects and/or advantages of the invention will be set forth in part in the description which follows and, in part, will be obvious from the description, or may be learned by practice of the invention.

In accordance with an example embodiment of the present invention, an apparatus for correcting an image signal generated by a charge coupled device (CCD) image sensor in an imaging system is provided with the CCD image sensor having a plurality of effective pixels and a plurality of optical black (OB) pixels to determine a dark reference of the image signal, and the imaging system including a plurality of gamma correction curves, each of which comprises a respective correction factor for increasing contrast in a dark portion of the image signal. The image correction apparatus comprises a measuring unit to measure a plurality of gray scale values of the plurality of effective pixels and the plurality of optical black (OB) pixels; an estimating unit to estimate a contrast level of an object scene to be imaged using the plurality of measured gray scale values; and a correcting unit to correct the image signal using a corresponding gamma correction curve, depending on the estimated contrast level of the object scene.

In accordance with another example embodiment of the present invention, an imaging system is provided with a charge coupled device (CCD) image sensor comprising a plurality of effective pixels for generating an image signal, and a plurality of optical black (OB) pixels for determining a dark reference of the image signal; a memory to store a plurality of gamma correction curves, each of which comprises a respective correction factor for increasing contrast in a dark portion of the image signal; and an image correction apparatus arranged to correct the image signal generated from the CCD image sensor, wherein the image correction apparatus comprises a measuring unit to measure a plurality of gray scale values of the plurality of effective pixels and the plurality of optical black (OB) pixels; an estimating unit to estimate a contrast level of an object scene to be imaged using the plurality of measured gray scale values; and a correcting unit to correct the image signal using a corresponding gamma correction curve, depending on the estimated contrast level of the object scene.

In accordance with yet another example embodiment of the present invention, a method of correcting an image signal generated by a charge coupled device (CCD) image sensor in an imaging system is provided with the charge coupled device (CCD) image sensor having a plurality of effective pixels for producing the image signal and a plurality of optical black (OB) pixels to determine a dark reference of the image signal, and the imaging system having a memory for storing a plurality of gamma correction curves, each of which has a respective correction factor to increase contrast in a dark portion of the image signal. Such a method comprises measuring a plurality of gray scale values of the plurality of effective pixels and the plurality of optical black (OB) pixels in the CCD image sensor; estimating a contrast level of an object scene to be imaged using the plurality of measured gray scale values; and correcting the image signal using a corresponding gamma correction curve depending on the estimated contrast level of the object scene.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
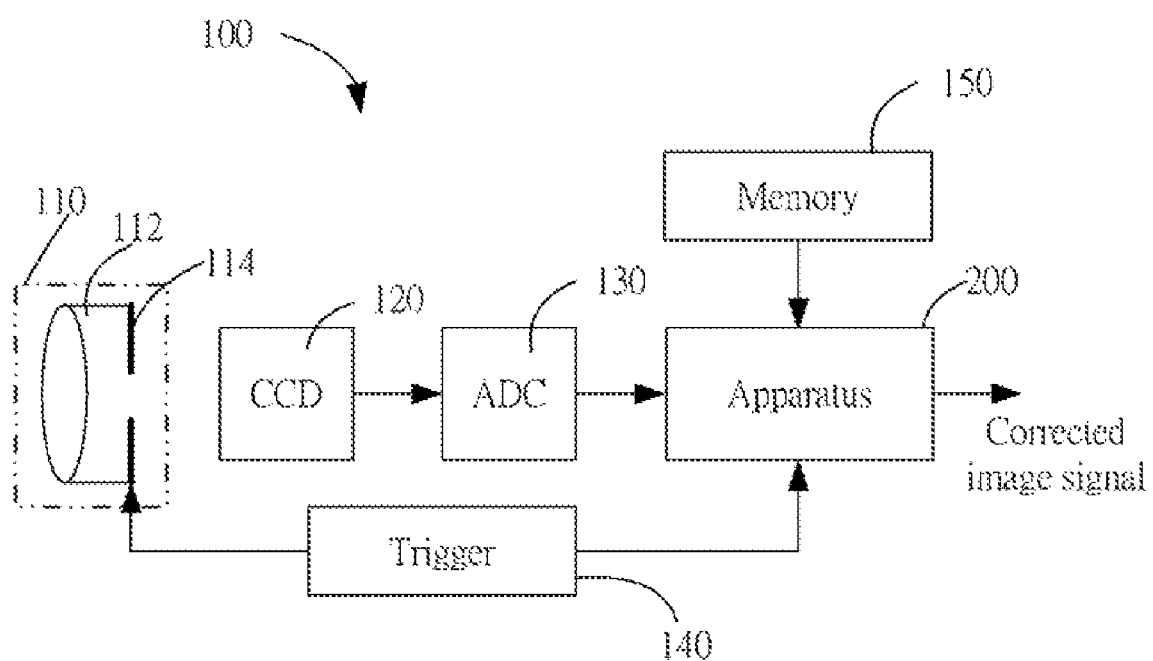
FIG. 1 is a block diagram of an imaging system including a pickup lens, a trigger mechanism and a charge coupled device (CCD) image sensor according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an imaging system including a pickup lens, a trigger mechanism and a charge coupled device (CCD) according to an example embodiment of the present invention. Referring to FIG. 1, an imaging system 100 includes an exposure section 110, an image sensor, such as a charge coupled device (CCD) image sensor 120, an analog-to-digital converter (ADC) 130, a trigger mechanism 140, a memory 150 and an apparatus 200 for correcting an image signal obtained from the CCD image sensor 120 (herein referred to as "an image correction apparatus" for the sake of brevity).

The exposure section 110 includes optics, such as a pickup lens 112 for directing image light from an object scene toward the CCD image sensor 120, and a shutter 114 for regulating exposure time. The pickup lens 112 is arranged to expose the CCD image sensor 120 to image light for a predetermined period of time dependent upon exposure requirements, for example, a time period between 1/1000 to several seconds (s). The photo-induced image charges are then swept from the pixels in the CCD image sensor 120 so as to form an image signal of an object scene in an analog form. The ADC 130 is configured to digitize the photo-induced charge generated by each pixel of the CCD image sensor 120 into a respective gray scale value of that pixel, and generate a digital image signal from the analog input signal for each pixel. The image correction apparatus 200 is then utilized to correct the image signal.

The trigger mechanism 140 is arranged to trigger a shutter 114 of the exposure section 110 and start operation of the image correction apparatus 200. The memory 150 is used to store a number of gamma correction curves, each of which includes a respective correction factor for increasing contrast between various dark portions of an image signal, and is used (e.g., selected and calculated) by the image correction apparatus 200 for correcting the image signal.

Figure 2:
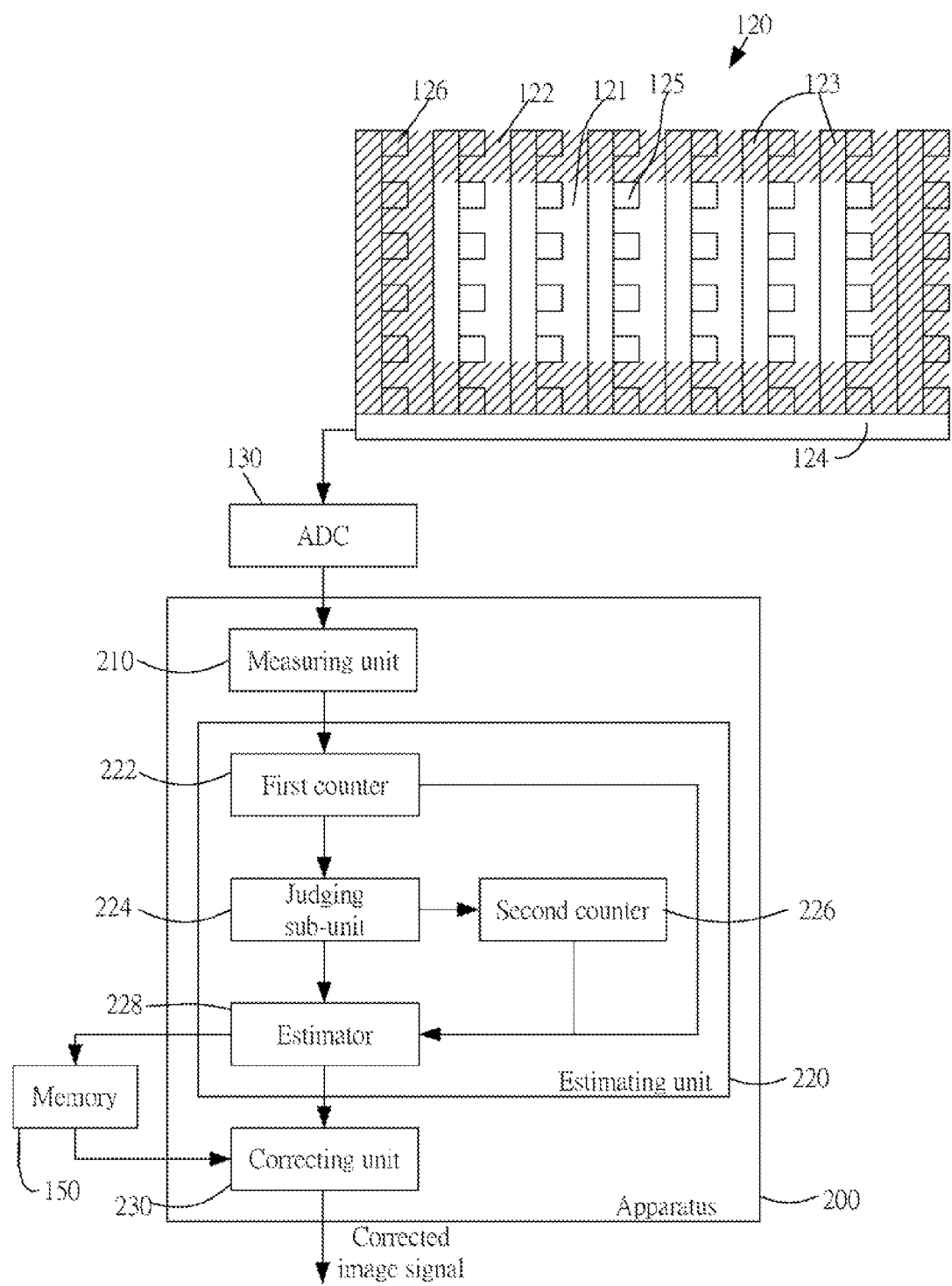
FIG. 2 is a detailed circuit diagram of a charge coupled device (CCD) image sensor and an image correction apparatus in the imaging system shown in FIG. 1.

Turning now to FIG. 2, detailed circuit diagram of the CDD image sensor 120 and the image correction apparatus 200 are shown. Referring to FIG. 2, the CCD image sensor 120 includes an effective pixel region 121, an optical black (OB) region 122, a number of shift registers 123, and a read out register 124. The effective pixel region 121 comprises a number of effective pixels 125 configured to produce an image signal. The optical black (OB) region 122 comprises a number of optical black (OB) pixels 126, each of which is configured to determine a respective dark reference (dark current) of a respective effective pixel 125. Each shift register 993 is configured to store and buffer the photo-induced charge of each pixel of a respective line (vertical line). The read out register 124 is configured to transfer, on a row by row basis, the photo-induced charge of each pixel buffered in the shift registers 123 to the ADC 130. Additional output amplifiers (not shown) may be used to output an image signal commensurate with the photo-induced charges transferred from the CCD image sensor 120.

Figure 3:
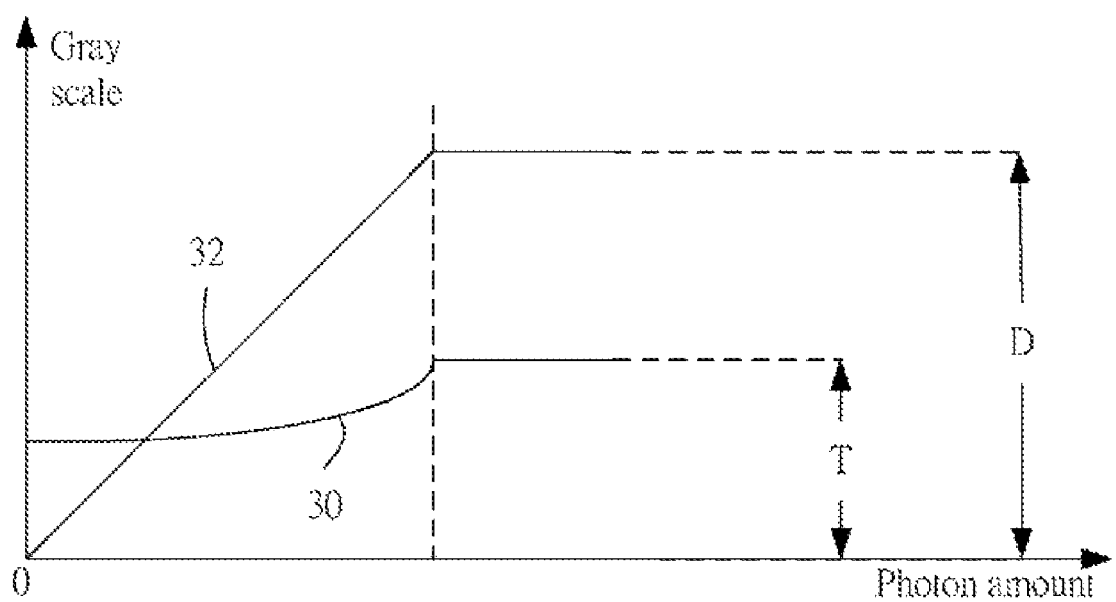
FIG. 3 illustrates a graph of a photoelectric conversion characteristic of an image signal generated from a charge coupled device (CCD) image sensor shown in FIG. 1 and FIG. 2.

FIG. 3 shows a photoelectric conversion characteristic of a CCD image sensor 120, shown in FIG. 2. The curves 30 and 32 respectively indicate a photoelectric conversion characteristic of the optical black (OB) pixels 126 and the effective pixels 125 in the CCD image sensor 120, and T and D respectively denote the highest gray scale value the optical black pixels 126 and the effective pixels 125 can generate.

Referring back to FIG. 2, the image correction apparatus 200 includes a measuring unit 210, an estimating unit 220, and a correcting unit 230. The measuring unit 210 is arranged to measure a gray scale value of each pixel of the CCD image sensor 120. The estimating unit 220 is configured to estimate a contrast level of an object scene using the measured gray scale values. The correcting unit 230 is configured to correct the image signal using a corresponding gamma curve selected, depending on the estimated contrast level of the object scene, from the memory 150.

Specifically, the estimating unit 220 includes a first counter 222, a judging sub-unit 224, a second counter 226, and an estimator 228. The first counter 222 is arranged to count a first amount of optical black (OB) pixels 126 in the CCD image sensor 120 with a gray scale value in a first predetermined gray scale range. The judging sub-unit 224 is configured to determine whether a smear effect induced in the CCD image sensor 120 is acceptable (e.g., no smear effect induced or the level of the smear effect is below a predetermined threshold) based the first counted amount from the first counter 222. The second counter 226 is arranged to count a second amount of effective pixels 125 in the CCD image sensor 120 with a gray scale value in a second predetermined gray scale range in the acceptable smear effect case. The estimator 228 is configured to estimate the contrast level of an object scene using the second amount in the acceptable smear effect case, or according to the level of the smear effect in the unacceptable smear effect case (e.g., the level of the smear effect exceeds the predetermined threshold).

Figure 4:
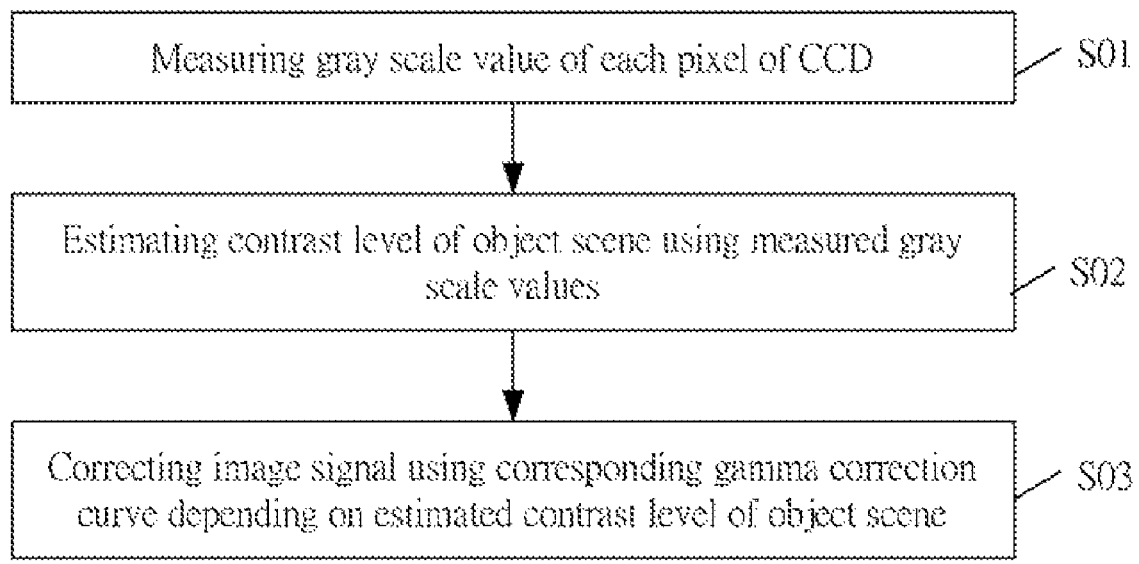
FIG. 4 is a flowchart of a method of correcting an image signal generated from a charge coupled device (CCD) image sensor according to an example embodiment of the present invention.

Turning now to FIG. 4, a method of correcting an image signal generated from a charge coupled device (CDD) image sensor according to an example embodiment of the present invention is shown. Such a method can be performed by the image correction apparatus 200, shown in FIG. 2. Referring to FIG. 4, a method of correcting an image signal generated from the CCD image sensor 120 includes the following operations:

Operation 410: Measuring the gray scale value of each pixel of the CCD image sensor 120 from the ADC 130. Specifically, before measuring, previewing by the imaging system 100 (e.g., zooming and focusing) is carried out to obtain a high quality image signal. Then, the trigger mechanism 140 is activated to trigger the shutter 114 of the exposure section 110 and start the image correction apparatus 200, as shown in FIG. 1. Thus, the image signal with the corresponding dark reference is generated, and is digitized by the ADC 130 into (D+1) scales.

Operation 420: Estimating the contrast level of an object scene using the measured gray scale values.

Operation 430: Correcting the image signal using a corresponding gamma correction curve depending on the estimated contrast level of the object scene.

As for operation 420 (estimating operation), it can be inferred that the higher contrast level of an object scene is, the more the detail loss of the dark portion of an image signal is, and the higher level the smear effect is. Therefore, the contrast level of the object scene can be estimated by either the level of lost image details of the dark portion of the image signal, or alternatively, the level of the smear effect. Whereas, if the smear effect is acceptable, the contrast level of the object scene can be advantageously estimated according to the amount of detail lost in the dark portion of the image signal, because, in this case, the level of the smear effect may be too low to discern the contrast levels of the object scene. Considering the detail loss of the dark portion of the image signal is related to the amount of the effective pixels 125 in the dark portion of the image signal (hereafter referred as "DP amount", the larger the DP amount is, the more the detail loss of the dark portion of the image signal is), the contrast level of the object scene can be estimated using the DP amount in the acceptable smear effect situation.

On the other hand, if the smear effect is not acceptable, photo-induced charges of the blooming effective pixels 125 in the CCD image sensor 120 will overflow to other pixels in the same line along the respective shift register 123, resulting in: (1) some effective pixels 125 in the same line corresponding to the dark portion of an object scene will exhibit an untrue high gray scale value (hereafter referred as "abnormal effective pixel"), the DP amount can not be accurately counted in this case; (2) some optical black (OB) pixels 126 in the same line exhibit an untrue gray scale value higher than the T (hereafter referred as "abnormal optical black (OB) pixel"), these abnormal optical black (OB) pixels are countable because their gray scale values exceed T; and (3) the greater the level of the smear effect, the greater number of the abnormal effective pixels and the abnormal optical black (OB) pixels there are, the level of the smear effect is related to the amount of abnormal optical black pixel (hereafter referred as "OB amount").

Therefore, the contrast level of an object scene can be advantageously estimated according to the level of the smear effect in the unacceptable smear effect situation, in view of the abovementioned (1) some effective pixels 125 in the same line corresponding to the dark portion of an object scene will exhibit an untrue high gray scale value (hereafter referred as "abnormal effective pixel"), and (3) the greater the level of the smear effect, the greater number of the abnormal effective pixels and the abnormal optical black (OB) pixels there are, the level of the smear effect is related to the amount of abnormal optical black pixel (the DP amount cannot be accurately counted in a high level smear effect situation).

Figure 5:
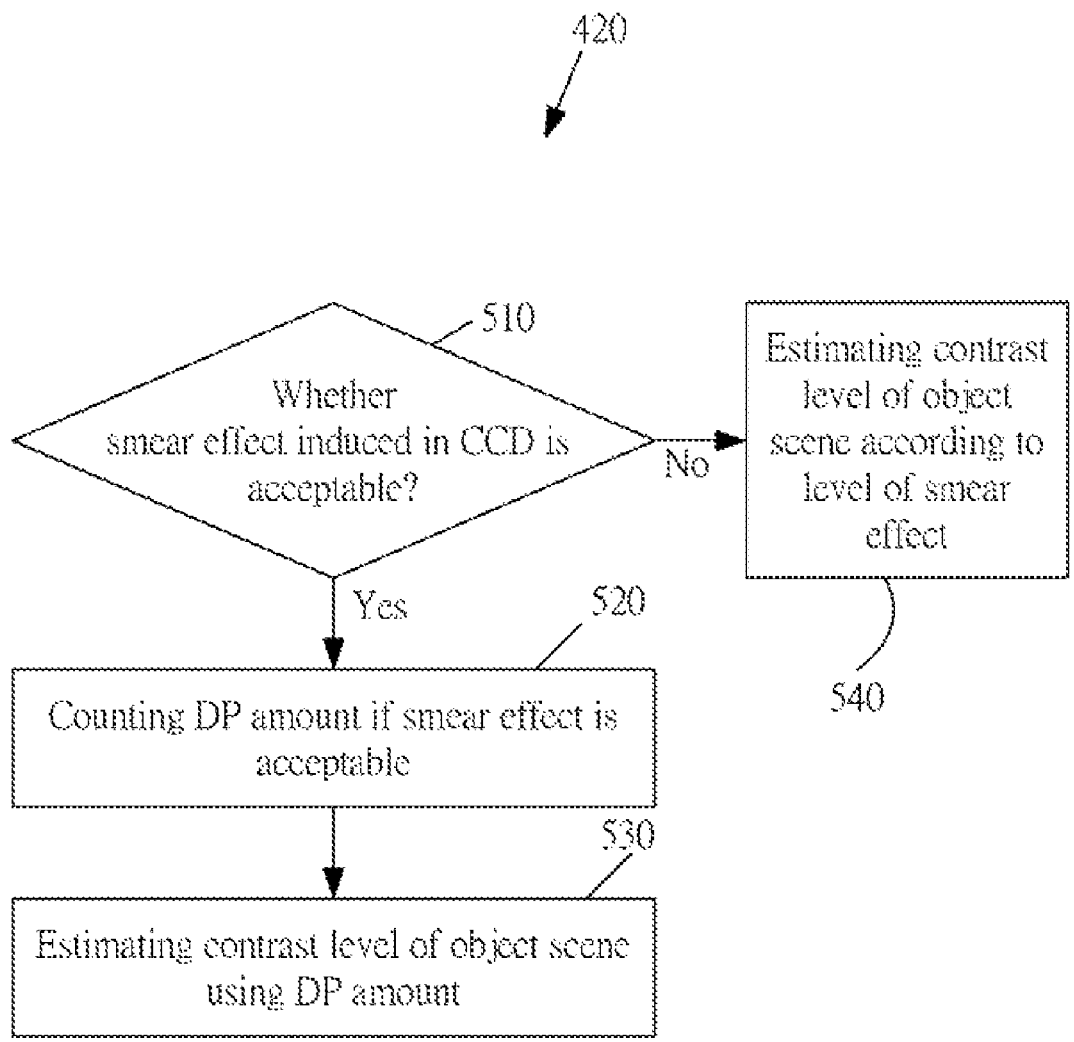
FIG. 5 is a sub-flow chart of the contrast level estimating operation shown in FIG. 4.

FIG. 5 is a sub-flow chart of the contrast level estimating operation 420, shown in FIG. 4. Referring to FIG. 5, the contrast level estimating operation 420 includes the following operations:

Operation 510: Determining whether the smear effect induced in the CCD image sensor 120 is acceptable;

Operation 520: Counting the DP amount if the smear effect induced in the CCD image sensor 120 is determined to be acceptable;

Operation 530: Estimating the contrast level of the object scene using the DP amount if the smear effect induced in the CCD image sensor 120 is determined to be acceptable; and Operation 540: Estimating the contrast level of the object scene according to the level of the smear effect if the smear effect induced in the CCD image sensor 120 is determined not to be acceptable.

Figure 6:
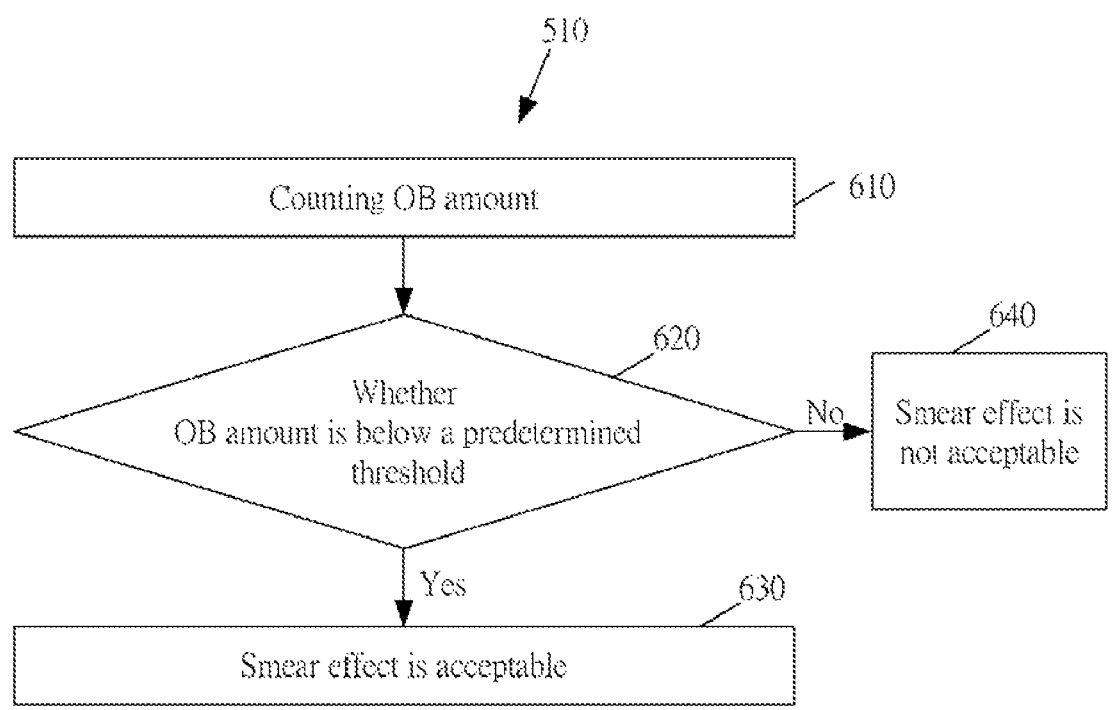
FIG. 6 is a sub-flow chart of the smear effect determining operation shown in FIG. 5.

FIG. 6 is a sub-flow chart of the smear effect determining operation 510, shown in FIG. 5. Referring to FIG. 6, the smear effect determining operation 510 includes the following operations:

Operation 610: Counting the OB amount, in detail, that is, the first counter 222 counts the first amount of the optical black (OB) pixels 126 with a gray scale value in the first predetermined gray scale range of T~D, and the first amount is the OB amount. Since the total amount of the optical black (OB) pixels 126 is invariable, the OB amount can be determined by the first counter 222 in counting the first amount of the optical black (OB) pixels 126 with a gray scale value in a first predetermined gray scale range of 0~T, and deducting the first amount from the total amount of the optical black (OB) pixels 126 in the CCD image sensor 120.

Operation 620: Determining whether the OB amount is below a predetermined threshold, where the predetermined threshold is settable, and is determined depending on a total amount of the optical black (OB) pixels 126 and/or the quality requirement of the image signal. As a part of operation 620, if the OB amount is determined to be below the predetermined threshold, the smear effect is acceptable at operation 630. Otherwise, the smear effect is not acceptable at operation 640. Particularly, the judging sub-unit 224 within the estimating unit 220, shown in FIG. 2, compares the OB amount with the predetermined threshold to determine whether the OB amount is below the predetermined threshold.

Referring back to FIG. 5, in operation 520 (DP amount counting step), the second counter 226 within the estimating unit 220, shown in FIG. 2, counts the second amount of the effective pixels 125 with a gray scale value in the second predetermined gray scale range of 0~31D/256 (the gray scale range of the dark portion of an image signal in this example embodiment, but not limited thereto), the second amount is the DP amount. Similar to counting OB amount, an alternative technique for the second counter 226 to determine the DP amount is to count the second amount of the effective pixels 125 in the CCD image sensor 120 with a gray scale in the second predetermined gray scale range of 31D/256~D, and deduct the second amount from the total amount of the effective pixels 125 in the CCD image sensor 120.

In operation 530 and operation 540, the estimator 228 within the estimating unit 220, shown in FIG. 2, divides a number range of 0~N into a plurality of first number sub-ranges, and records the first number sub-ranges therein, where N is the total amount of the effective pixels 125 or the optical black (OB) pixels 126 in the CCD image sensor 120. Each first number sub-range is related to one respective contrast level of the object scene. The estimator 228 compares the DP amount with each first number sub-range to find out the contrast level of the object scene the DP amount is related to, if the smear effect is judged to be acceptable. On the other hand, the estimator 228 further divides a second number range of P~N into a plurality of second number sub-ranges, and records the second number sub-ranges therein, where P is the predetermined number. The estimator 228 compares the OB amount with each second number sub-range and determines the contrast level of the object scene the OB amount is related to, if the smear effect is determined not to be acceptable.

In this example embodiment of the present invention, the estimator 228 within the estimating unit 220, shown in FIG. 2, divides and records three first number sub-ranges and three second number sub-ranges, each first number sub-range is related to a respective second number sub-range, and is related to a respective contrast level of the object scene. In other words, the estimator 228 can discern three contrast levels of the object scene, and the memory 150 stores three gamma correction curves therein.

Referring back to FIG. 4, in operation 430 (correcting operation), the correcting unit 230, shown in FIG. 2, selects a gamma correction curve according to the estimated contrast level of the object scene, and corrects the image signal. Two examples of such an image correction operation 430 are described in connection with FIG. 7 and FIG. 10 herein below.

Figure 7:
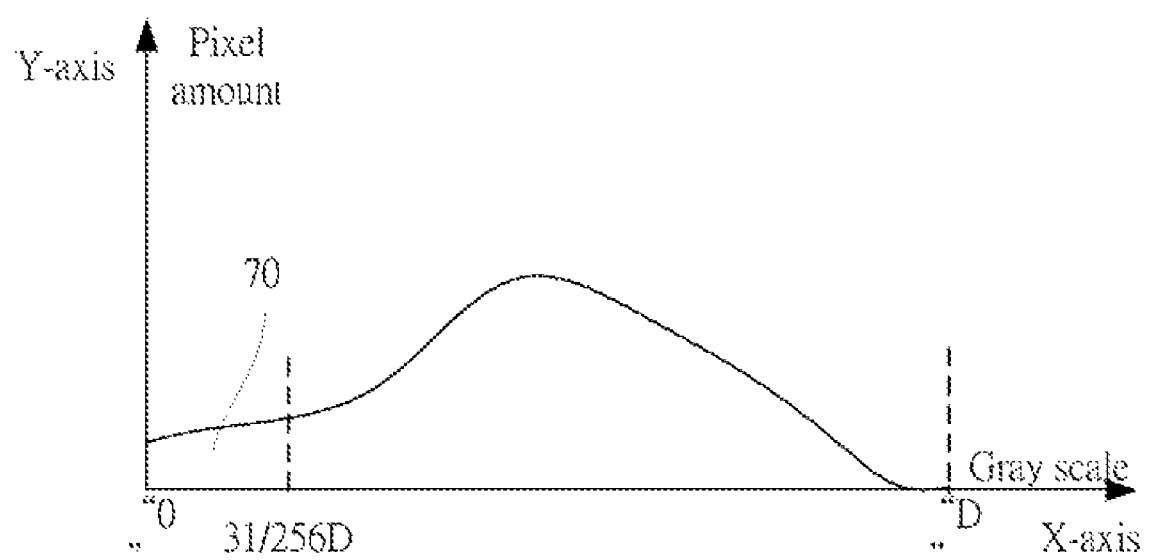
FIG. 7 illustrates a gray scale histogram of an image signal to be corrected according to an example embodiment of the present invention.
Figure 8:
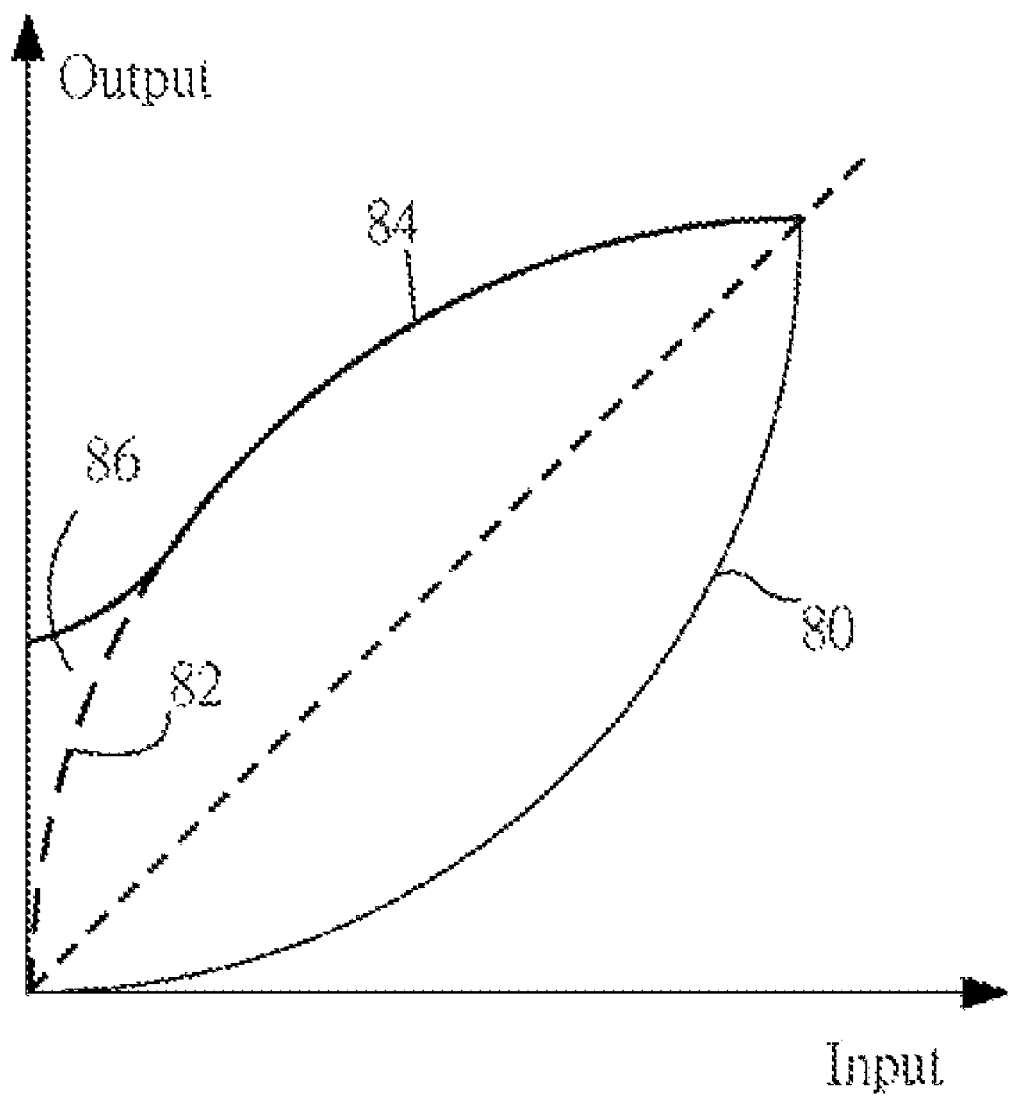
FIG. 8 illustrates a graph of a gamma correction curve used to correct an image signal shown in FIG. 7.

For example, FIG. 7 illustrates a gray scale histogram of an image signal to be corrected in accordance with a first example. As shown in FIG. 7, an area 70 designated represents a dark portion of the image signal. Referring to FIG. 8, the curve 80 denotes a non-linear input-output characteristic curve of a display device for displaying the image signal; the curve 82 denotes a typical gamma curve for pre-correcting the non-linear input-output characteristics of the display device; the curve 84 is the corresponding gamma curve selected from the memory 150 for correcting the image signal; and the area 86 (defined by the curve 84, 82 and the ordinate) is the respective correction factor for increasing contrast of the dark portion of the image signal.

Figure 9:
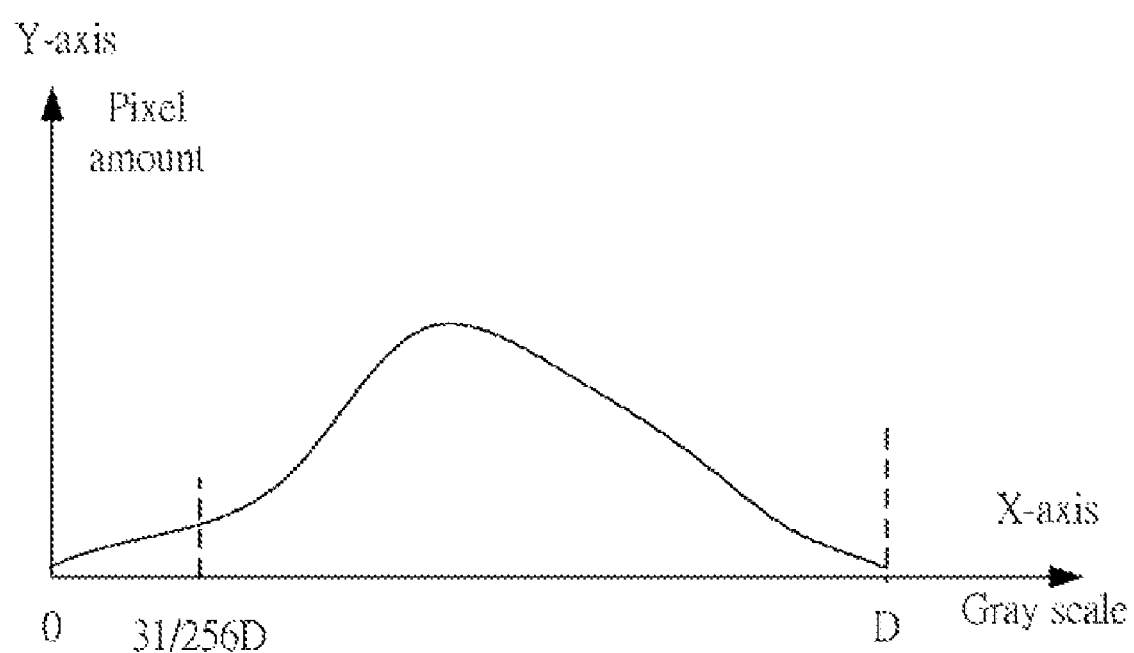
FIG. 9 illustrates a gray scale histogram of an image signal shown in FIG. 7 to be corrected using the gamma correction curve shown in FIG. 8.

FIG. 9 shows a gray scale histogram of a corrected image signal in accordance with the first example. As shown in FIG. 9, after correcting, the detail loss of the dark portion of the image signal is improved significantly.

Figure 10:
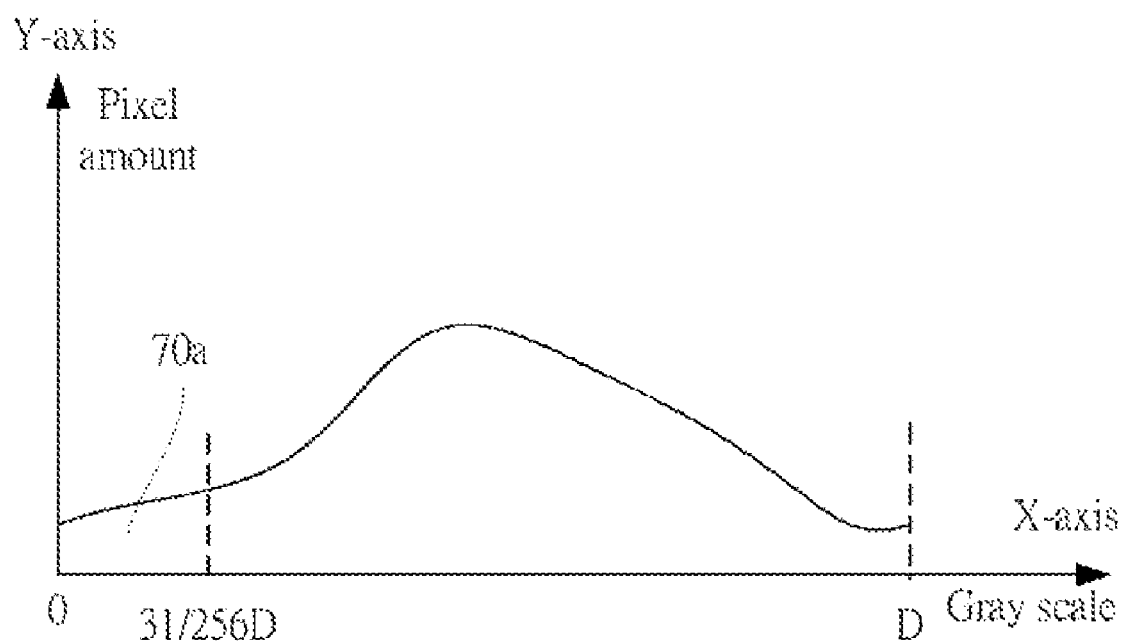
FIG. 10 illustrates a graph gray scale histogram of an image signal to be corrected according to another example embodiment of the present invention.
Figure 11:
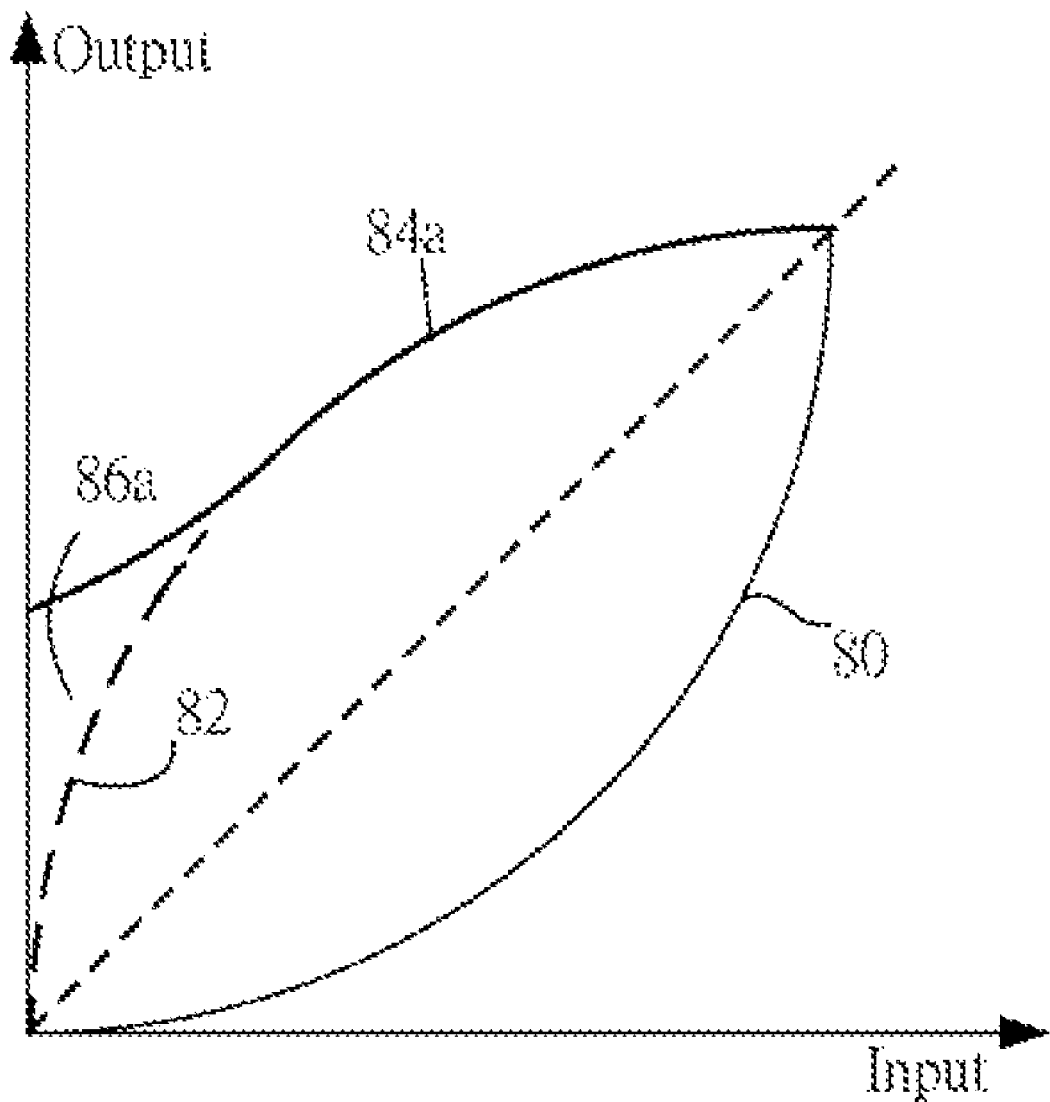
FIG. 11 illustrates a graph of another gamma correction curve used to correct an image signal shown in FIG. 10.
Figure 12:
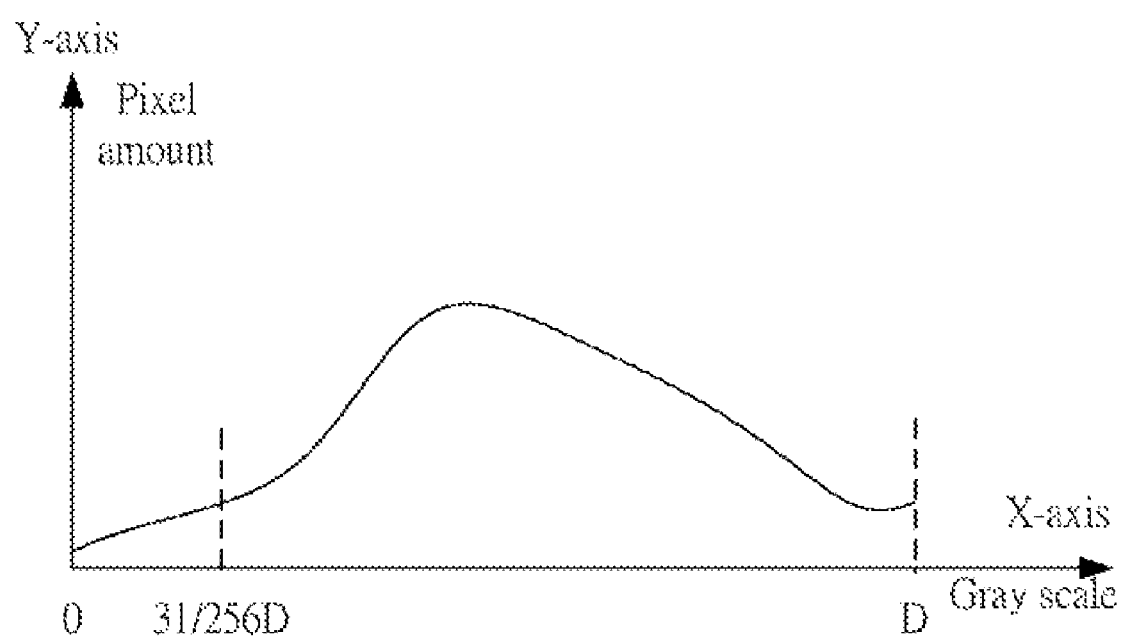
FIG. 12 illustrates a gray scale histogram of an image signal shown in FIG. 10 to be corrected using the gamma correction curve shown in FIG. 11.
Figure 13:
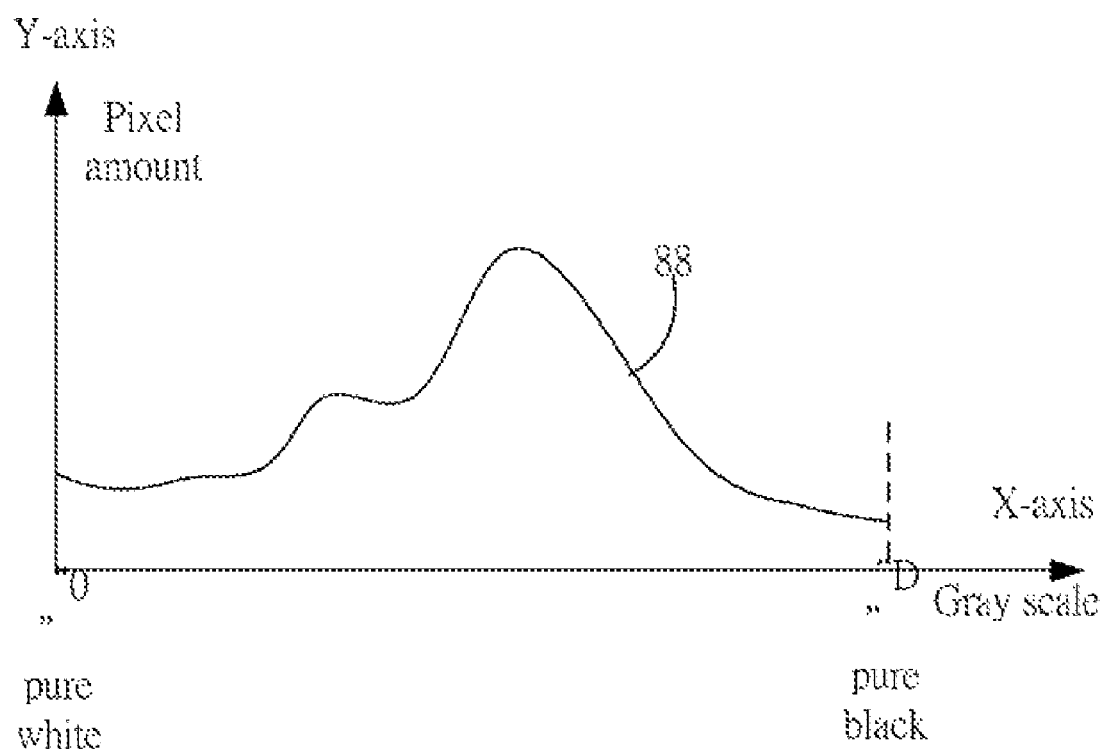
FIG. 13 illustrates a gray scale histogram of an image signal describing an object scene with a brightness range beyond a dynamic/effective range of a CCD image sensor.
Figure 14:
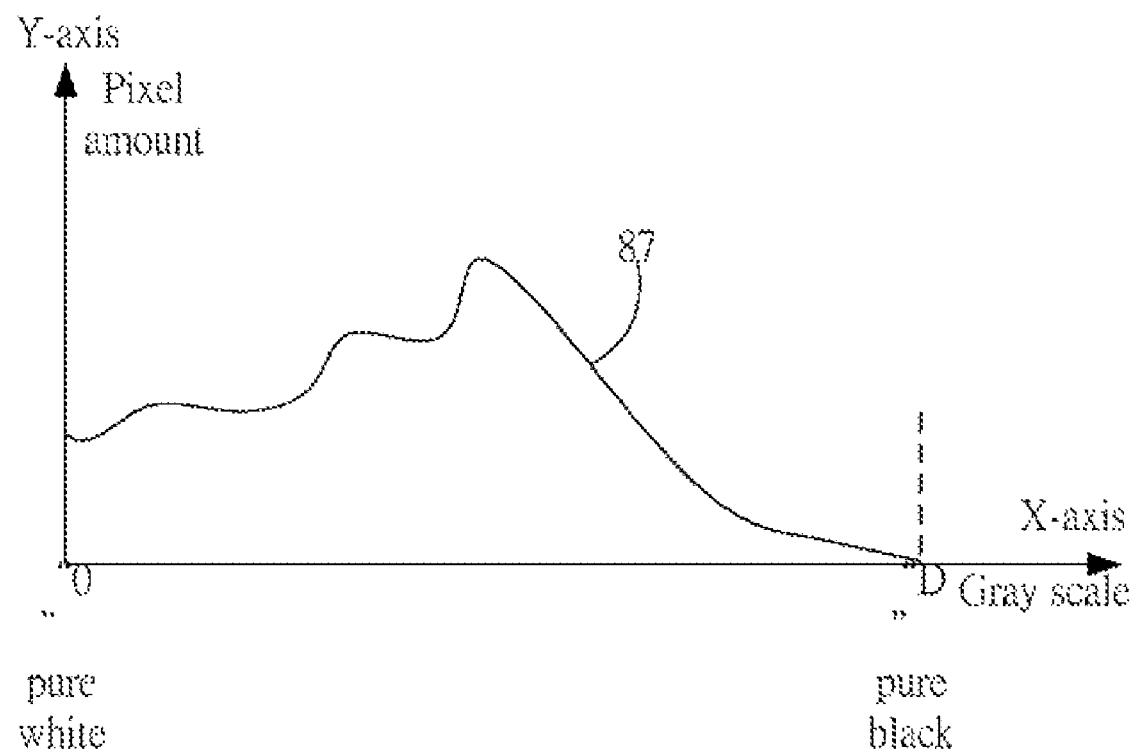
FIG. 14 is a gray scale histogram of an image signal describing an object scene, when a CCD image sensor is exposed to reduced light intensity to avoid inducing the smear effect in an image.

Turning now to FIG. 10, a gray scale histogram of an image signal to be corrected in accordance with a second example is shown. As shown in FIG. 10, an area 70a represents a dark portion of the image signal. FIG. 11 shows another gamma correction curve 84a including a corresponding correction factor 86a, the correction factor 86a is capable of increasing contrast of the dark portion of the image signal. FIG. 12 illustrates a gray scale histogram of a corrected image signal in accordance with the second example.

It is to be understood that all the predetermined terms in the example embodiment of the present invention, e.g., the first predetermined gray scale range in operation 610, shown in FIG. 6, and the second predetermined gray scale range in operation 520, shown in FIG. 5, are settable, and can be preset depending on the quality requirement of the image signal, the total amount of the gray scales, and/or the total amount of the pixels of the CCD image sensor 120. Additionally, the correction factor introduced in each gamma curve is predetermined according to what degree of contrast is desired in the dark regions of an image signal and applied to that portion of the gamma curve affecting the dark regions of an image signal.

As described in the foregoing, the imaging system 100, the image correction apparatus 200, and the method as shown in FIG. 4, FIG. 5 and FIG. 6, are capable of improving the detail loss of the dark portion of the image signal, thus the quality of the image signal is improved.

Various components of the image correction apparatus 200, as shown in FIG. 1 and FIG. 2, such as the measuring unit 210, the estimating unit 220 and the correcting unit 230 can be integrated into a single control unit, or alternatively, can be implemented in software algorithm or hardware, such as, for example, a field programmable gate array (FPGA) or an application specific integrated circuit (ASIC). In addition, method steps of FIG. 4, FIG. 5 and FIG. 6, may be performed by the same control unit or a processor executing instructions organized into a program module or a custom designed state machine. As such, it is intended that the processes described herein be broadly interpreted as being equivalently performed by software, hardware, or a combination thereof. As previously discussed, software modules can be written, via a variety of software languages, including C, C++, Java, Visual Basic, and many others. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the system and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. Accordingly, it is intended, therefore, that the present invention not be limited to the various example embodiments disclosed, but that the present invention includes all embodiments falling within the scope of the appended claims.

What is claimed is:

1. A method of correcting an image signal generated by a charge coupled device (CCD) image sensor of an imaging system, the charge coupled device (CCD) image sensor comprising a plurality of effective pixels for producing the image signal and a plurality of optical black (OB) pixels for determining a dark reference of the image signal, the imaging system comprising a memory for storing a plurality of gamma correction curves, each of which has a respective correction factor to increase contrast in a dark portion of the image signal, the method comprising:

measuring a plurality of gray scale values of the plurality of effective pixels and the plurality of optical black (OB) pixels in the CCD image sensor;

estimating a contrast level of an object scene to be imaged using the plurality of measured gray scale values; and correcting the image signal using a corresponding gamma correction curve depending on the estimated contrast level of the object scene, wherein the estimating of the contrast level of the object scene comprises:

determining whether a smear effect induced in the CCD image sensor is acceptable;

counting an amount of effective pixels that are in a dark portion of the image signal, if the smear effect is acceptable, and estimating a contrast level of the object scene using the amount of the effective pixels in the dark portion of the image signal, if the smear effect is acceptable, and estimating the contrast level of the object scene according to the level of the smear effect, if the smear effect is not acceptable.

2. The method as claimed in claim 1, wherein the determining of the smear effect comprises:

counting an amount of optical black (OB) pixels with a gray scale value exceeding a predetermined gray scale value; determining whether the amount of the optical black (OB) pixels with a gray scale value exceeding the predetermined gray scale value is below a predetermined threshold;

if the amount of the optical black (OB) pixels with a gray scale value exceeding the predetermined gray scale value is below the predetermined threshold, the smear effect is determined as acceptable.

3. The method as claimed in claim 2, wherein the estimating of the contrast level comprises:

dividing a number range of P~N into a plurality of number sub-ranges, where P is the predetermined number, N is the total amount of the optical black (OB) pixels, each number sub-range being related to one respective contrast level of the object scene;

comparing the amount of the optical black (OB) pixels with a gray scale value exceeding the predetermined gray scale value with each number sub-range to determine the contrast level of the object scene using the amount of the optical black (OB) pixels with a gray scale value exceeding the predetermined gray scale value, if the smear effect is determined not acceptable.

4. The method as claimed in claim 1, wherein the estimating of the contrast level comprises:

dividing a number range of 0~N into a plurality of number sub-ranges, where N is the total amount of the effective pixels in the CCD image sensor, each number sub-range being related to one respective contrast level of the object scene;

comparing the amount of the effective pixel in the dark portion of the image signal with each number sub-range to determine the contrast level of the object scene using the amount of the effective pixel in the dark portion of the image signal, if the smear effect is determined as acceptable.

5. The method as claimed in claim 1, wherein the level of the smear effect is estimated using an amount of optical black (OB) pixels in the CCD image sensor with a gray scale value exceeding a predetermined gray scale value.

6. An apparatus for correcting an image signal generated by a charge coupled device (CCD) image sensor in an imaging system, the charge coupled device (CCD) image sensor comprising a plurality of effective pixels and a plurality of optical black (OB) pixels for determining a dark reference of the image signal, the imaging system storing a plurality of gamma correction curves, each of which comprises a respective correction factor for increasing contrast in a dark portion of the image signal, the apparatus comprising:

a measuring unit to measure a plurality of gray scale values of the plurality of effective pixels and the plurality of optical black (OB) pixels;

an estimating unit to estimate a contrast level of an object scene to be imaged using the plurality of measured gray scale values; and a correcting unit to correct the image signal using a corresponding gamma correction curve, depending on the estimated contrast level of the object scene, wherein the estimating unit comprises:

a first counter to count a first amount of optical black (OB) pixels with a gray scale value in a first predetermined gray scale range;

a judging sub-unit to determine whether a smear effect induced in the charge coupled device (CCD) image sensor is acceptable using the first amount;

a second counter to count a second amount of effective pixels with a gray scale value in a second predetermined gray scale range; and an estimator to estimate the contrast level of the object scene using the second amount if the smear effect is acceptable, and to estimate the contrast level of the object scene using the first amount if the smear effect is not acceptable.

7. The apparatus as claimed in claim 6, the first predetermined gray scale range is selected from a group of: gray scale range 0~T and gray scale range T~D, where T, D are the respective highest gray scale value, the optical black (OB) pixels and the effective pixels can generate.

8. The apparatus as claimed in claim 6, wherein the judging sub-unit is arranged to determine whether a first amount of the optical black (OB) pixels with a gray scale value in a first predetermined gray scale range of T~D is under a predetermined number, where T, D are the respective highest gray scale value, the optical black (OB) pixels and the effective pixels can generate; if the first amount of optical black (OB) pixels with a gray scale value in the first predetermined gray scale range of T~D is below a predetermined number, the smear effect is determined as acceptable.

9. The apparatus as claimed in claim 8, wherein the estimator divides the number range of P~N into a plurality of number sub-ranges, and records the plurality of number sub-ranges therein, where P is the predetermined number, N is the total amount of the plurality of optical black (OB) pixels, each number sub-range being related to one respective contrast level of the object scene, and wherein the estimator is further configured to compare the first amount with each number sub-range to determine the contrast level of the object scene, if the smear effect is determined not acceptable.

10. The apparatus as claimed in claim 6, wherein the second predetermined gray scale range is a gray scale range of the dark portion of the image signal.

11. The apparatus as claimed in claim 6, wherein the estimator divides the number range of 0~N into a plurality of number sub-ranges, and records the plurality of number sub-range therein, where N is the total amount of the effective pixels, each number sub-range being related to one respective contrast level of object scene, and wherein the estimator is further configured to compare the second amount with each number sub-range to determine the contrast level of the object scene, if the smear effect is determined as acceptable.

12. The apparatus as claimed in claim 6, wherein the correcting unit relates each contrast level of the object scene to the respective gamma correction curve.

13. An imaging system comprising:
an image sensor comprising a plurality of effective pixels for generating an image signal; and a plurality of optical black (OB) pixels for determining a dark reference of the image signal;

a memory to store a plurality of gamma correction curves, each of which comprises a respective correction factor for increasing contrast in a dark portion of the image signal; and an image correction apparatus arranged to correct the image signal generated from the image sensor, the image correction apparatus comprising:

a measuring unit to measure a plurality of gray scale values of the plurality of effective pixels and the plurality of optical black (OB) pixels;

an estimating unit to estimate a contrast level of an object scene to be imaged using the plurality of measured gray scale values; and a correcting unit to correct the image signal using a corresponding gamma correction curve, depending on the estimated contrast level of the object scene;

wherein the image sensor is a charge coupled device (CCD) image sensor;

wherein the contrast level of the object scene is estimated according to an amount of effective pixels in a dark portion of the image signal;

wherein the estimating unit is configured to determine whether the smear effect induced in the CCD image sensor is acceptable, to count the amount of effective pixels in the dark portion of the image signal when the smear effect is acceptable, and the estimate the contrast level of the object scene using either the amount effective pixels in the dark portion of the image signal when the smear effect is acceptable or the level of the smear effect when the smear effect is not acceptable.

14. The image system as claimed in claim 13, wherein the smear effect induced in the CCD image sensor is determined acceptable by counting an amount of abnormal optical black (OB) pixels in the CCD image sensor and determining whether the amount of abnormal optical black (OB) pixels in the CCD image sensor is below a predetermined threshold.

15. The image system as claimed in claim 13, wherein the estimating unit comprises:

a first counter arranged to count an amount of abnormal optical black (OB) pixels in the CCD image sensor, and to output a first count value;

a judging sub-unit to determine whether the smear effect induced in the CCD image sensor is acceptable using the first count value;

a second counter arranged to count an amount of effective pixels in a dark portion of the image signal when the smear effect induced in the CCD image sensor is acceptable, and to output a second count value; and an estimator to estimate the contrast level of the object scene using the second count value when the smear effect is acceptable, and to estimate the contrast level of the object scene using the first count value when the smear effect is not acceptable.

16. The image system as claimed in claim 15, wherein the correcting unit relates each contrast level of the object scene to the respective gamma correction curve.

* * * * *